United States Patent
Watanabe et al.

(10) Patent No.: US 6,424,787 B2
(45) Date of Patent: *Jul. 23, 2002

(54) MAGNETIC RECORDING/REPRODUCING APPARATUS AND THE SAME EQUIPPED WITH AN IMAGE SENSOR

(75) Inventors: Katsuyuki Watanabe, Mito; Hideo Nishijima, Hitachinaka; Koichi Ono; Akihito Nishizawa, both of Yokosuka; Kazuaki Hori, Chigasaki, all of (JP)

(73) Assignees: Hitachi, Ltd., Tokyo; Hitachi Video and Information System, Inc., Yokohama, both of (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/774,662

(22) Filed: Feb. 1, 2001

Related U.S. Application Data (63) Continuation of application No. 08/996,207, filed on Dec. 22, 1997, now Pat. No. 6,215,948.

(30) Foreign Application Priority Data

Dec. 20, 1996 (JP) ................................................ 8-341490

(51) Int. Cl.[7] ................................................ H04N 5/76
(52) U.S. Cl. ......................................... 386/38; 358/906
(58) Field of Search ................................. 386/1, 34, 36, 386/38, 44, 46, 107, 117, 26; 358/906, 909.1; H04N 5/76

(56) References Cited

U.S. PATENT DOCUMENTS

| | | | | |
|---|---|---|---|---|
| 5,142,375 A | * | 8/1992 | Fukuda et al. | 386/34 |
| 5,570,128 A | * | 10/1996 | Kawahara | 358/906 |
| 6,215,948 B1 | * | 4/2001 | Watanabe et al. | 386/38 |

FOREIGN PATENT DOCUMENTS

JP        8-51565        2/1996

* cited by examiner

*Primary Examiner*—Huy T Nguyen
(74) *Attorney, Agent, or Firm*—Crowell & Moring LLP (57) ABSTRACT

A magnetic recording/reproducing apparatus equipped with an image sensor, has a camera portion having an A/D converter for converting a signal from an image sensor into a digital signal and a first digital processor for receiving an output of the A/D converter and for digitally processing thereof. A VTR portion of a helical scan type mounts at least two or more of magnetic heads for recording/reproducing a FM modulated luminance signal and a low band converted chrominance signal. A second digital processor processes a video signal of the VTR. A switching circuit is provided in a preceding stage of the A/D converter. The image sensor signal, an external video signal and a reproduced signal from the magnetic heads are exchanged. The output of the A/D converter is inputed to the second digital processor, and a sampling clock of the A/D converter is exchanged to the most appropriate clock for the respective image sensor signal, the external video signal and the reproduced signal from the magnetic heads.

5 Claims, 6 Drawing Sheets

MAGNETIC RECORDING/REPRODUCING APPARATUS AND THE SAME EQUIPPED WITH AN IMAGE SENSOR

This application is a continuation of application Ser. No. 08/996,207, filed Dec. 22, 1997 U.S. Pat No. 6,215,948.

BACKGROUND OF THE INVENTION

This application claims the priority of Japanese application 8-341490, the disclosure of which is expressly incorporated by reference herein.

1. Field of the Invention

The present invention relates to a magnetic recording/reproducing apparatus which is able to record and reproduce a signal from an image sensor such as a CCD, as well as a composite video signal, in particular, to the magnetic recording/reproducing apparatus equipped with such the image sensor formed or constructed as an unit, in which a camera portion and a video signal processing portion thereof are realized by digital signal processing circuits.

2. Description of the Related Art

Almost of video signal processing in a conventional VTR set of stationary type for home use and a portable VTR equipped with a camera formed or constructed as an unit, such as so-called a camcorder, is constructed with a signal processing circuit for an analogue signal processing. However, with a VTR under the S-VHS standard and/or a camcorder under the Hi8 standard which are already available on the market, the signal processing circuit thereof is constructed with a digital signal processing circuit.

Especially, for the case of the camcorder, a system is proposed, in which an A/D converter is commonly used by sharing with a digital processor of the camera portion (hereinafter, "a camera DSP") and a digital processor of the VTR portion (hereinafter, "a video DSP") thereof, for example in Japanese Patent Laying Open No. 8-51565 (1996). In this case, for decreasing the number of pins of the IC of the A/D converter, three kinds of input signals, i.e., a camera signal from the camera system, a video signal from a line input terminal, and a reproduced video signal from a VTR system, are inputted to the A/D converter for common use after being selected through a change-over switch, and a digital signal outputted therefrom is distributed through another change-over switch. Further, an interface circuit is provided for compensating level differences occurred during this period among those three kinds of signals.

SUMMARY OF THE INVENTION

Inventors of the present invention acknowledged following problems with respect to the prior art mentioned in the above publication (i.e., Japanese Patent Laying Open No. 8-51565 (1996)).

First of all, the reproduced signal inputted into the A/D converter is the video signal which has been treated with FM demodulation, therefore, an analogue processing circuitry is still necessary for the part of signals up to the demodulation. Namely, there are mixed the digital circuit and the analogue circuit in the circuitry for processing the video signal in the VTR portion, therefore being complex in the structure.

Further, in case of sharing the A/D converter in common with the camera DSP and the video DSP, a new technology with respect to the video signal processing is necessary, however, there is no disclosure about it in that publication.

The object of the present invention, in accordance with the present invention, is to provide a low price magnetic recording/reproducing apparatus and the same equipped with an image sensor as an unit, with which the video signal can be processed more suitably when sharing the A/D converter in common with the camera DSP and the video DSP.

When processing the reproduced FM signal (before demodulation) from the magnetic head by converting it into a digital signal, comparing with the signal from the image pick-up element which is converted from an analogue into a digital signal and processed by the camera DSP, and with a signal which is obtained by A/D conversion of an external input signal (the composite video signal), there are difference in sampling frequency due to frequency band of signals. Therefore, the sampling frequencies are different due to the difference in frequency bands of the signals and the difference lies between the camera processing and the VTR processing. Those cannot be dissolved only by compensating the level differences among those signals.

Further, with a performance that is necessary for the A/D converter used in the conventional camera DSP, it must operate at a sampling clock around at 4 fsc (here, fsc: a frequency of color sub-carrier, and 14.3 MHz, for example, in a case of NTSC set), and it must have 9 through 10 in the bits number thereof. Consequently, such the A/D converter which is used in those has the maximum about 15 MHz through 20 MHz in the sampling frequency. On the contrary to this, with the video DSP, since it treats with the reproduced FM signal of wide frequency band, it cannot satisfy a theorem necessary for sampling with such the sampling clock at 4 fsc (14.3 MHz) mentioned above, and necessitates a sampling clock higher than that. On the other hand, ordinarily the clock signal of 4 fsc is used for processing of the video signal after the FM demodulation, and as for dealing with this case, it is easy and common technique to set the clock at 8 fsc (28.6 MHz) two times higher than it with respect to the FM signal. Namely, by using the A/D converter of 30 MHz class in the maximum sampling frequency, the video DSP circuit can be simplified in the structure, on the contrary, it means that a very expensive A/D converter is used therein, therefore, it is not in conformity with an object of the present invention.

In accordance with the present invention, it is an object to provide a magnetic recording/reproducing apparatus having a low price signal processing circuit, by using the A/D converter of performance less than 20 MHz which has been conventionally used in the camera DPS as the A/D converter, in which a clock signal of an appropriate sampling frequency is supplied to the A/D converter in each of operation modes, i.e., a mode of camera recording, a mode of external input recording, and a mode of reproducing, and in particular in the reproducing mode, after completing the sampling by the available maximum frequency thereof, the reproducing process is carried out by exchanging or converting the clock rate to a system clock frequency which is used for video signal processing.

Further, a main function of the camera DSP is of receiving and outputting signals from and to the image sensor, then it is difficult to maintain synchronization with the video DSP. For dealing with this, in accordance with the present invention, in the operation of the video DSP, the signal is processed by using the clock of the camera DSP in the camera mode, while it is processed by using the system clock which is generated within the video DSP in the external inputting mode. Namely, the signal processing comes to be easy between those two DSPs which are in the synchronization, by exchanging or converting between the clock from the camera DSP and the system clock generated within the video DSP.

Furthermore, in accordance with the present invention, it is assumed that the sampling rate of the camera DSP is exchanged depending on the number of the picture elements or pixels of various kinds of the image sensors. In the case that the sampling rate of the camera DSP differs greatly from that of the video DSP, it becomes more difficult to process the video signals therewith. As a method for dissolving such the problem, in accordance with the present invention, there is provided a low price magnetic recording/reproducing apparatus with an image sensor, in which the clocks are unified as an original one clock signal for common use in both the camera DSP and the video DSP, so as to keep the two DSPs in synchronism basically, and then the sampling rate, which is variable depending on the number of the picture elements of the image pick-up element, is compensated at the side of the video DSP in the camera recording mode, thereby making the signal processing in common after the compensation, and simplifying the signal processing in the video DSP.

BRIEF DESCRIPTION OF THE DRAWINGS

These and other features, objects and advantages of the present invention will become more apparent from the following description when taken in conjunction with the accompanying drawings, wherein.

DESCRIPTION OF THE PREFERRED EMBODIMENTS

Figure 1:
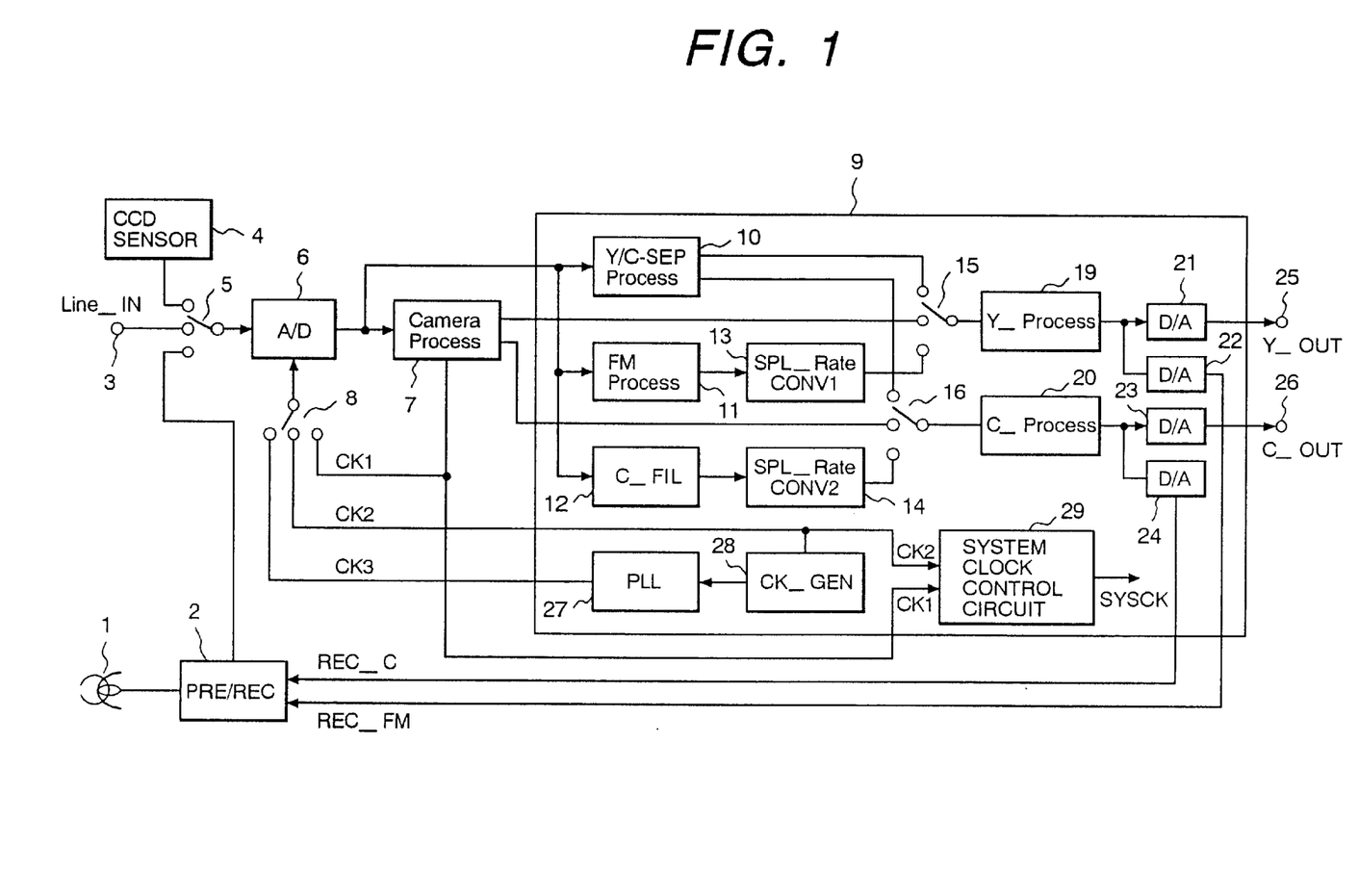
FIG. 1 shows a construction of a signal processing system of a magnetic recording/reproducing apparatus equipped with an image pick-up element in accordance with a first embodiment of the present invention.

Hereinafter, an explanation of a first embodiment of the present invention will be given with reference to attached drawings. FIG. 1 shows a circuit construction of a signal processing circuit of a camcorder. There are three (3) modes in the camcorder, i.e., camera recording mode, external input recording mode and reproducing mode, and each of them will be explained one by one.

Fist of all, an operation in the camera recording mode will be explained. A signal from an image sensor 4 (recently, an solid state image sensor, such as a CCD (abbreviation of "Charge Coupled Device") is generally used) is inputted through a switch circuit 5 to an A/D converter 6 to be converted into a digital signal. At this time, the A/D converter 6 performs sampling with a clock (CK1) which is generated in a camera DSP 7. For instance, in the camcorder of NTSC, the number of picture elements or pixels of 1H (H: a horizontal scanning period) is 910, and this is same to the sampling number when the NTSC signal is sampled with the sampling frequency 4 fsc. Namely, with an above image sensor (a type of high number of picture elements or pixels, the sampling frequency is the 4 fsc. An output of the A/D converter 6 is processed in the camera DSP 7. The signal processed by the camera DSP 7 is transferred to a video DSP 9 in a condition of the digital signal. A luminance signal is transferred through a switch circuit 15 to a luminance signal processing circuit 19 so as to be processed as the luminance signal and to be FM modulated. The FM modulated record signal is converted by a D/A converter 22 into an analogue signal and sent to the a recording/reproducing amplifier 2, and a monitor output signal which is outputted to a monitor TV is converted by a D/A converter 21 into an analogue signal to be outputted at a terminal 25. A color or chrominance signal is transferred through a switch circuit 16 to a chrominance signal processing circuit 20, and after it is processed as the chrominance signal and converted into a low band converted chrominance signal, it is further converted into an analogue signal by a D/A converter 24. The analogue signal is sent to the recording/reproducing amplifier 2 to be multiplexed with a FM signal therein, and is supplied to a magnetic head as a recording current. While, the monitor output signal to be displayed onto the monitor TV is converted by a D/A converter 23 into an analogue signal to be outputted at a terminal 26.

Here, an explanation will be given on a system clock which is used inside of the video DSP. Generally, when the camera DSP 7 and the video DSP 9 are designed independent from each other, the clocks used in those two DSPs are out of synchronism with each other in almost of the cases. In the camera recording mode, with respect to the digital signal sent from the camera DSP, it is processed by using the clock which is generated by the camera DSP. Accordingly, the clock (CK1) outputted from the camera DSP 7 is inputted to a system clock control circuit 29 of the video DPS so as to be supplied as the system clock (SYSCK=CK1) inside of the video DSP.

Next, an explanation will be given on an operation in the external input recording mode. A composite video signal coming from an input terminal 3 is inputted through the switch circuit 5 to the A/D converter 6 to be converted into a digital signal. At this time, the A/D converter 6 is sampling with a clock (CK2) which is generated by a clock generator 28 of the video DSP 9, and in general, the system clock (CK2) is set at 4 fsc in the same manner as the camera DSP, in almost of the cases for the NTSC signal. An output of the A/D converter 6 is divided into the luminance signal and the chrominance signal in a Y/C separating circuit 10 of the video DSP 9, and they are sent to the luminance signal processing circuit 19 and the chrominance signal processing circuit 20, respectively through switches 15 and 16. The processing thereafter is same as mentioned in the above. The system clock (SYSCK) is switched to the output (CK2) of the clock generator 28 in the system clock control circuit 29 so as to be supplied as the SYSCK=CK2 inside of the video DSP.

Description is made on the camera recording mode and the external input recording mode in the above, however, for the purpose of sharing the A/D converter in common for use in both the camera DSP and the video DSP, it is important aspects to exchange the system clock inside of the video DSP, of course to exchange the sampling clock of the A/D converter as well.

Lastly, an explanation will be given on an operation in the reproducing mode. A signal reproduced from the magnetic head 1, after being sufficiently amplified by the recording/ reproducing amplifier 2, is inputted through the switch circuit 5 to the A/D converter 6 so as to be converted into a digital signal. At this time, the A/D converter is performing the sampling operation with a clock (CK3) which is generated by a PLL circuit 27 of the video DSP 9. The output of the A/D converter 6 is divided and processed through a FM processing circuit 11 and a low pass color filter (C_LPF) 12, respectively. In particular, the FM luminance signal is demodulated into the video signal in the FM signal processing circuit 11. The output signals of the FM signal processing circuit 11 and the low pass color filter 12 are inputted to sampling rate converting circuits 13 and 14 to be converted to a desired sampling rate (in this embodiment, the CK2). After being converted, they are inputted through the switch circuits 15 and 16 to the luminance signal processing circuit 19 and the chrominance signal processing circuit 20, so as to be converted into the analogue signals by the D/A converters 21 and 23 and to be outputted as a reproduced luminance signal and a reproduced chrominance signal at the terminals 25 and 26, respectively.

Figure 2:
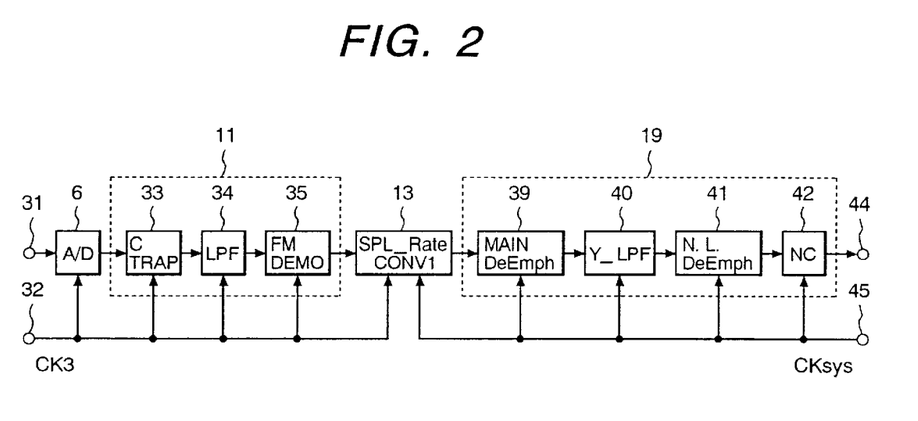
FIG. 2 shows an example of a reproduced luminance signal processing block in the embodiment shown in FIG. 1.

The above explanation was given on the outline of the signal processing circuit of the camcorder with reference to FIG. 1, in the above, then, more detailed explanation will be given on the luminance signal processing circuit for the reproducing mode by reference to FIG. 2. The reproduced signal inputted from a terminal 31, after being converted into a digital signal by the A/D converter 6 and removed with the low band converted chrominance signal by a chroma trap 33, is further removed with disturbance due to inter-modulation and then demodulated into a video signal through a FM demodulator 35. About the inter-modulation disturbance will be explained later. The signal processing up to here is carried out by using the sampling clock (CK3) of the A/D converter 6 as the clock signal.

An output of the FM demodulator 35 is converted in the rate into the clock frequency which is used in the video signal processing with the sampling rate converting circuit 13. In general, since the reproduced signal processing circuits are mostly designed in common in the circuitry for the recording signal processing circuits, the signal can be processed with the same clock frequency as in the recording mode by doing so, thereby it is possible to simplify the circuit designing, and in addition thereto, to achieve small-sizing in the circuit scale.

The video signal which is converted in the sampling rate thereof is processed into a reproduced signal of superior S/N ratio with a main de-emphasis circuit 39, a main LPF 40 for the luminance signal, a non-linear de-emphasis circuit 41, and a noise canceller 42, and it is outputted at the terminal 44. The signal is further processed with a system clock (SYSCK=CK2) which is inputted from the terminal 45 in the circuitry of downstream from the sampling rate converting circuit 13.

Figure 4:
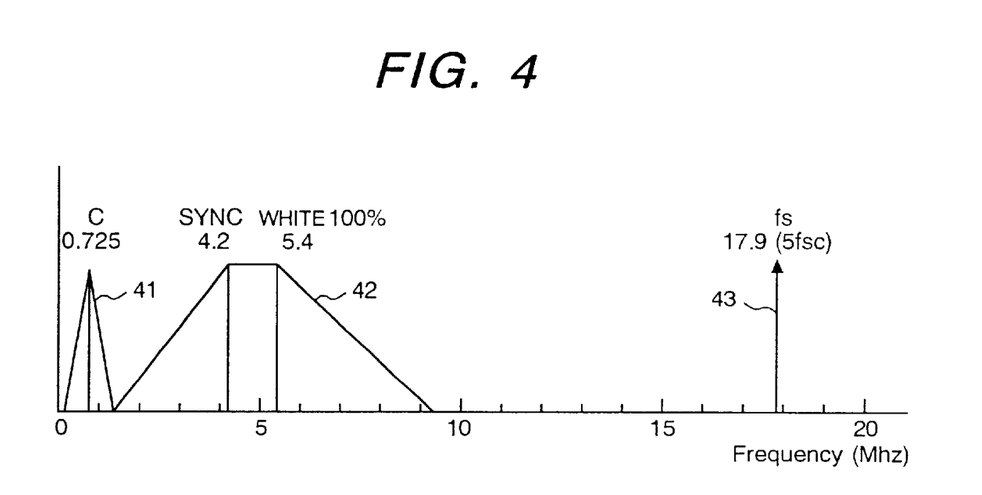
FIG. 4 shows frequency allocations in a VTR under the 8 mm standard.

Next, an explanation will be given on the intermodulation disturbance mentioned in the above. Here, the relationship in the frequencies between the reproduced FM signal and the sampling clock will be explained by referring to FIGS. 4 and 5. FIG. 4 shows the relationship between the sampling frequency and the frequency allocations under the standard for 8 mm VTR of NTSC. The FM luminance signal 42 is distributed at the frequency of 4.2 MHz as an edge of the SYNC and at a frequency of 5.4 MHz as white (100%). Furthermore, by taking a white clip standard for +220% (assuming that to the white (100%) from the edge of the SYNC is +100%) into a consideration, although not shown in the drawing, the maximum carrier frequency fwc comes to be at 6.84 MHz. The low band converted chrominance signal 41 is about at 725 kHz, and it is multiplexed at the lower side frequency of the FM luminance signal. As shown in FIG. 4, an upper side-band of the FM luminance signal is lying until the vicinity of 10 MHz, therefore, the theorem for sampling cannot be satisfied at the sampling frequency of 4 fsc (14.3 MHz). Further, as the A/D converter, it is assumed that the converter of 20 MHz at the maximum sampling frequency is used from a view point of price thereof. Under such the restriction, as such the sampling clock 43, it is selected at the frequency 5 fsc (17.9 MHz). Inherently under the 8 mm VTR standard, the FM audio signal is multiplexed at the frequency between the low band converted chrominance signal and the FM luminance signal, however, since it has no relationship with the processing in the video DSP, the explanation of this is omitted here.

Figure 5:
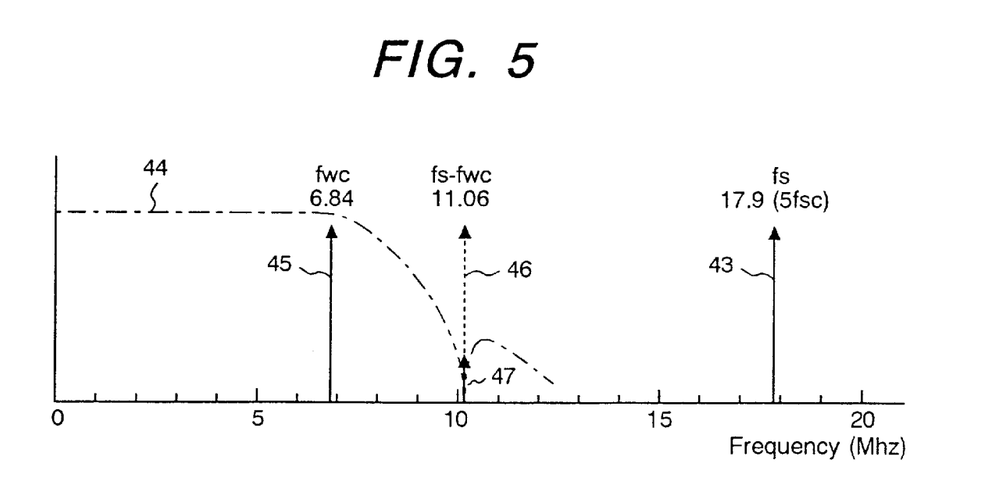
FIG. 5 shows a characteristic of a low pass filter shown in FIG. 2.

FIG. 5 shows a characteristic of the inter-modulation disturbance and a low pass filter (hereinafter, it is called as only a "LPF") for removing it when the sampling is conducted. In general, when an input signal is converted from an analogue into a digital with a clock of the sampling frequency fs, the inter-modulation disturbance will occur at the frequency difference (fs−f) between the frequency f of the input signal and the sampling frequency fs. If the sampling frequency is sufficiently higher than with respect to that of the input signal, the frequency difference (fs−f) is also high with respect to that of the input signal, thereby causing almost no problem. However, in case of A/D conversion of the FM luminance signal, as indicated with an arrow 45, since the maximum carrier frequency fwc is high at 6.87 MHz, the frequency difference (fs−fwc) comes to be 11.06 MHz (as indicated by an arrow of dotted line 46) which will cause problem when being demodulated with it. Therefore, with provision of a trap point on an amplitude characteristic at the frequency of 11.06 MHz with the LPF which is provided after the A/D conversion, as shown by an one-dotted chained line 44, the frequency difference (fs−fwc) is suppressed and the disturbance component of a broken-line arrow 46 is also fully suppressed as shown by a solid line arrow 47, thereby removing the disturbance during the demodulation.

Figure 3:
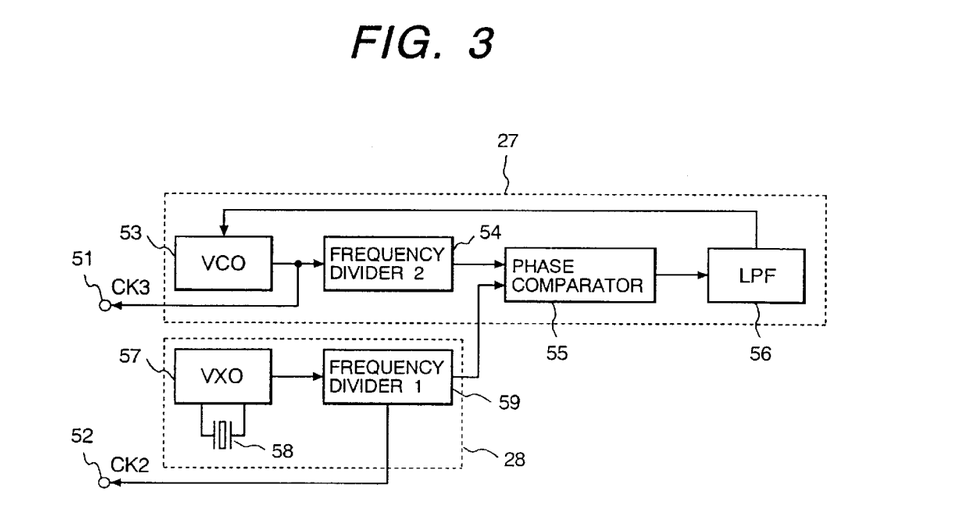
FIG. 3 shows an example of a clock generator block in the embodiment shown in FIG. 1.

Next, with referring to FIG. 3, a generating method of the clocks (CK2) and (CK3) will be explained. As shown in FIG. 2, when convering the sampling rate of the signal, since the conversion is very difficult if the clock signals before and after the conversion are not synchronized with each other, there is a necessity of obtaining the synchronization between the two clocks previously. The clock (CK2) is used in the recording mode and in the process after the sampling rate conversion during the reproducing, and it is produced with high accuracy by an oscillator 57 by using a crystal oscillator 58 as a reference clock. For example, the oscillation frequency of the oscillator 57 is 8 fsc. By producing the clock of 4 fsc from a frequency divider 59, it is outputted as the clock (CK2) at the terminal 52. Further, with respect to the clock (CK3), by oscillating a desired frequency clock by an oscillator 53, comparing it in the phase with the output of a frequency divider 59 by a phase comparator 55 after being divided by a frequency divider 54, and further feeding a phase error through LPF 56 back to a controlled oscillator 53 so as to construct a PLL loop, it is produced in synchronism with the clock (CK2) and outputted at a terminal 51. However, blocks 27 and 28 indicated by the frameworks of dotted line are those corresponding to the PLL circuit 27 and the clock generating circuit 28, which are shown in FIG. 1.

Figure 6:
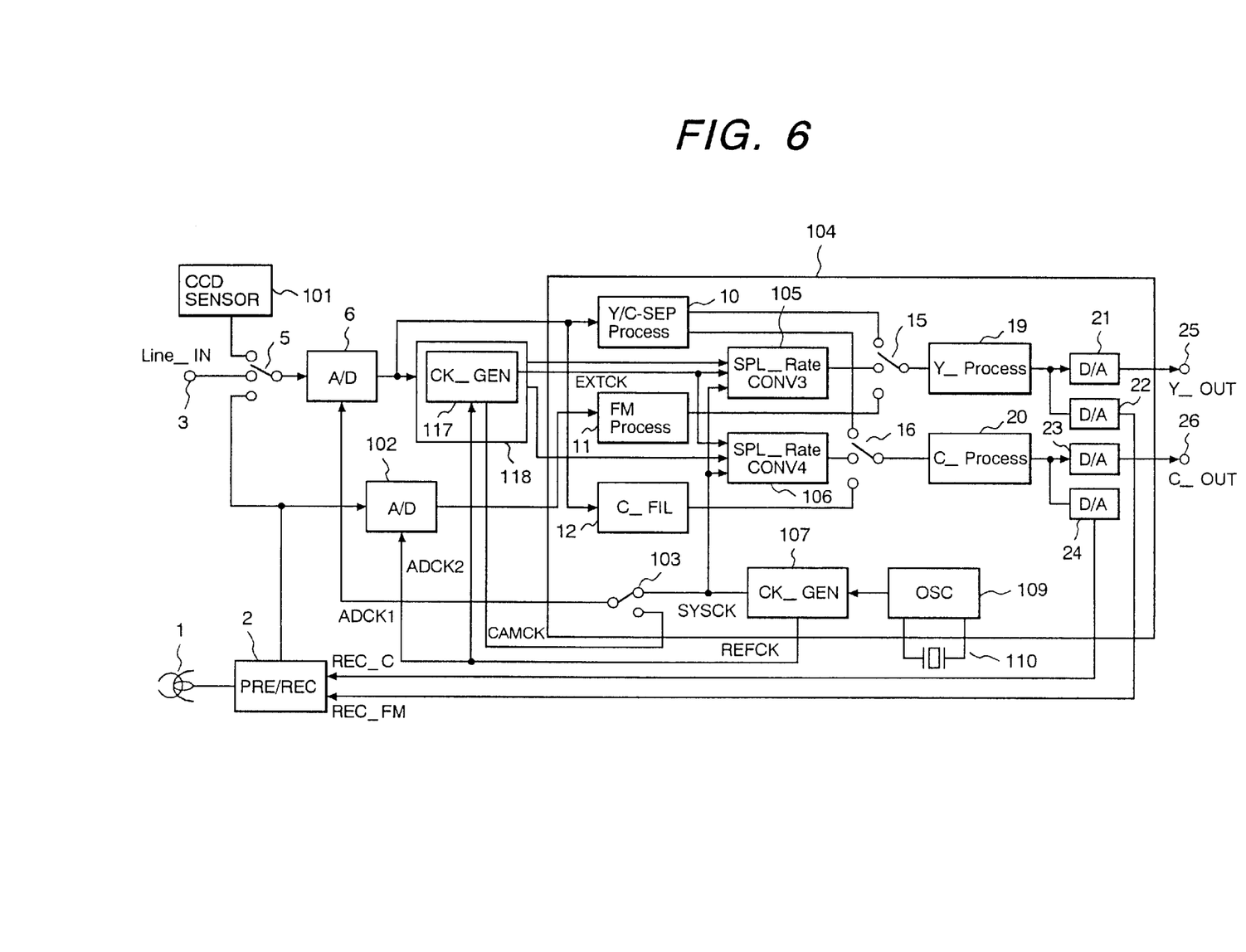
FIG. 6 shows a construction of a signal processing system of a magnetic recording/reproducing apparatus equipped with an image pick-up element in accordance with a second embodiment of the present invention.

Next, a second embodiment in accordance with the present invention will be explained by referring to FIGS. 6 and 7. FIG. 6 shows the signal processing circuit of the camcorder. The same elements shown in the embodiment in FIG. 1 are attached with the same reference numerals and the detailed explanation thereof will be omitted. The resolution power of the camcorder is determined by the number of the picture elements or pixels of the image sensor which is used. In a high grade or quality model is used an image sensor having a greater number of the picture elements or pixels, while in an ordinary model an image sensor having a relative low number of the pixels. Further, when performing the signal processing in the camera DSP, the sampling frequency must be different depending on the number of the pixels. Hereinafter, an explanation will be given by taking the image sensor as an example which is applied to the camcorder of the NTSC.

As explained in the embodiment in FIG. 1, those 910 picture elements or pixels are provided for 1H in the image sensor of high pixel number, and it is the same to the sampling number when the NTSC signal is sampled with the sampling frequency 4 fsc. Namely, with the image sensor of high pixel number, the sampling frequency comes to be 4 fsc. On the contrary to this, when the number of pixels of the low pixel number image sensor is selected at 606 or the like for 1H for example, it is about 2/3 in the number of pixels of the high pixel image sensor, therefore the sampling frequency for the low pixel number image sensor is (8/3) fsc. In this manner, in case of receiving and processing the signal with the video DSP, the sampling frequency of which must be different depending on the number of the pixels, since the circuit which performs the processing is the same in the structure but is different in the frequency, there is a necessity of exchanging a coefficient of the circuit in order to maintain the characteristic at a constant, and this incurs complicated circuitry designing and increase in gate number thereof. The number of the pixels of the image sensor is not always same with manufactures thereof, and is sometimes different depending on the specification of the set, therefore it is difficult to determine the circuit constant readily at a certain value in setting thereof. Taking such the respects into consideration, in accordance with the present embodiment, the digital signal transferred from the camera DSP in the camera recording mode is converted in the sampling rate, so as to make it equal to the sampling frequency of the image sensor of high pixel number for a reference, thereby performing the same processing thereafter.

Differing from the first embodiment, in the present embodiment, also for simplifying the explanation thereof, an A/D converter 102 is so constructed that it is independently provided with respect to the processing of the FM signal. As a feature of the system construction, only one system of an oscillator 109 (here, an oscillator of using a crystal oscillator 110) is provided for those two (2) digital processors. Inside of the video DSP 104A, there is provided a clock generator 107, from which are produced a system clock (SYSCK) for use in the video DSP 104 and a clock (REFCK) used as a reference clock of the camera DSP 118. The camera DSP 118 is also so constructed that it produces a clock (omitted in FIG. 6) for use inside thereof with a clock generator 117 on the basis of the REFCK signal mentioned above, and a clock (EXTCK) in synchronism with a digital data outputted to the video DSP 104. As mentioned in the previous embodiment, in case of a sensor of high pixel number, the above-mentioned EXTCK and the system clock (SYSCK) in the video DSP 104 can be coincident with each other in the frequency. For making them coincident with each other completely, there is one ways in which those two (2) digital processors are operated on the basis of the same reference clock, or the other way in which the clock of the other digital processor is locked in the phase by a PLL (abbreviation of a "Phase Locked Loop"). The present embodiment is in accordance with the former method. Actually, two (2) clocks generated from the same clock are coincident with each other in the frequency, however, it is difficult to make them completely coincide with each other in the phase due to an effect of delay between those two (2) digital processors, etc. Consequently, when transferring them between those two (2) digital processors as they are, it is difficult to take in or fetch the data with stability. For avoiding this, there are necessitated sampling rate converting circuits 105 and 106 for converting a data in synchronism with the clock (EXTCK) outputted from the camera DSP 118 into a data in synchronism with the system clock (SYSCK) inside of the video DSP 104.

Figure 7:
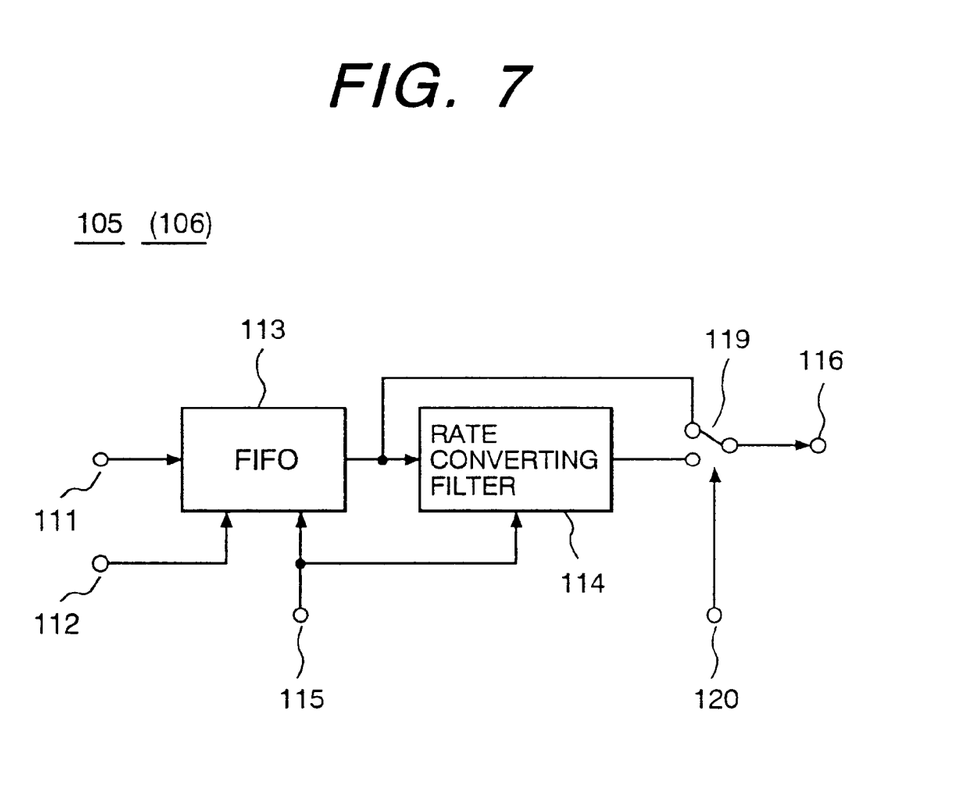
FIG. 7 shows a concrete construction of a sample rate converting circuit in the embodiment shown in FIG. 6.

FIG. 7 shows a construction of the sampling rate converting circuit. A reference numeral 111 denotes a data input terminal, 112 an input terminal for the external clock (EXTCK), 113 a FIFO (abbreviation of First in First out), 115 a system clock input terminal, 114 a sample rate converting filter, 119 a switching circuit, 120 a control signal input terminal, and 116 an output terminal. First, the digital data which is in synchronism with the EXTCK and inputted from the terminal 111 is converted into a digital date in synchronism with the SYSCK within the FIFO 113. In the camcorder using the high pixel number CCD, the output of the FIFO 113 is transferred through the switching circuit 119 to the output terminal 116, on the while, in the camcorder using the low pixel number CCD, the output processed by the FIFO 113, after complementation of the data with the filter 114 for the sampling rate conversion, is outputted through the switch circuit 119 at the output terminal 116.

In the same manner for either the camcorder with the low pixel number CCD sensor or the high pixel number CCD sensor, the outputs of the sampling rate converting circuits 105 and 106 which are obtained in such manner are inputted to the luminance signal processing circuit 19 and the chrominance signal processing circuit 20, respectively, and then, they are converted into the analogue signals with the D/A converters 22 and 24 to be recorded onto a magnetic tape through the recording/reproducing amplifier 2. In this manner, by conducting the data transfer between those two (2) digital processors through the sampling rate converting circuit, in addition of operating those two (2) digital processors on the basis of the only one oscillator 109, stable signal transfer can be achieved, and further it can be converted easily if any one of sensors having various pixel number is used in the camera portion, thereby obtaining a merit that the processing thereafter can be unified. Furthermore, it is explained that the A/D converter 102 is conditioned of being provided outside of the video DSP, but alternatively it can be provided inside thereof. Moreover, the oscillator 109 and the switching circuit 103 are provided inside of the video DSP 104, but they also may be provided at the side of the camera DSP without trouble.

Figure 8:
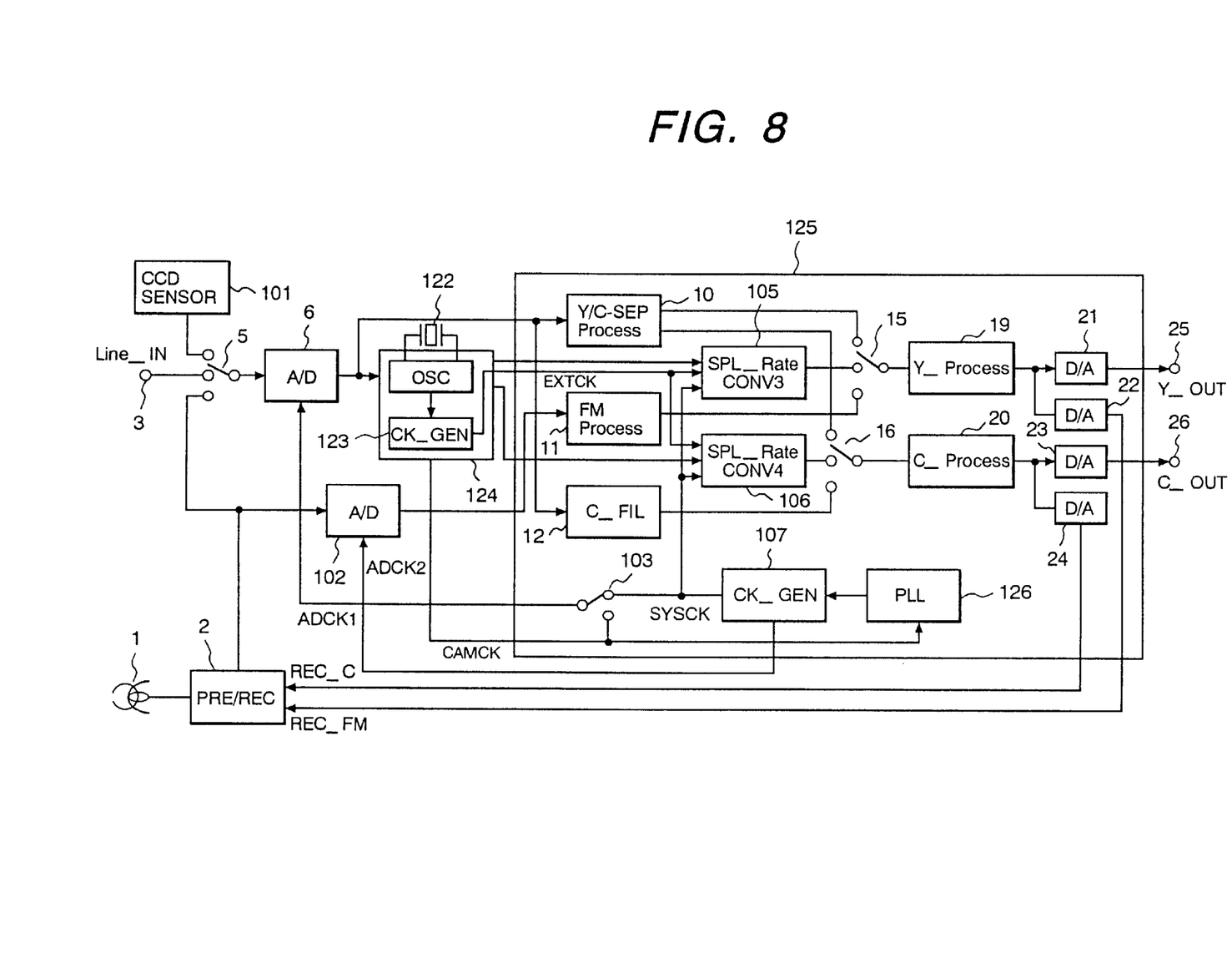
FIG. 8 shows a construction of a signal processing system of a magnetic recording/reproducing apparatus equipped with an image pick-up element in accordance with a third embodiment of the present invention.

Next, a third embodiment in accordance with the present invention will be explained by referring to FIG. 8. FIG. 8 shows the signal processing circuit of the camcorder. The same elements shown in the embodiment in FIG. 6 are attached with the same reference numerals and the detailed explanation thereof will be omitted. The difference from that shown in FIG. 6 lies in a method for generating the clock which is used in the camera DSP 124 and video DSP 125. In the present embodiment, an oscillator 127 is provided at the side of the camera DSP 124, and from the output terminals thereof are outputted the clock (EXTCK) for use in signal transfer, the clock for use in the A/D converter 6, and a reference clock (CAMCK) for use as a reference in the video DSP to the video DSP 125. Within the video DSP, the above-mentioned reference clock (CAMCK) is inputted to the PLL circuit 126 to generate a clock in synchronism with the CAMCK in the phase, and it is sent to a clock generator 107 so as to produce the system clock (SYSCK) for use in the video DSP 125, etc. In those sample rate converting circuit 105 and 106, data transfer is performed by using the system clock (SYSCK) in synchronism with the external clock (EXTCK) inputted from the camera DSP. Operation other than this is the same to that of the embodiment shown in FIG. 6.

As explained in the above with the second and third embodiments, the explanation was given basically on the assumption that those two (2) DSPs are brought in synchronism with each other by unifying or joining the reference clocks of the camera DSP and the video DSP as a one signal, however, if the camera DSP and the video DSP are constructed on the basis of the clocks which are completely different to each other, they can be measured by newly-devising the sampling rate conversion within the breadth of an idea of the present invention.

Further, in the explanation given in the above, only the low pixel number sensor and the high pixel number (standard) sensor are mentioned as the image sensors. However, there can be considered a camcorder of high quality picture using another sensor which has the resolution power higher than that of the high pixel number sensor. In this case, it is apparent that the signal can be processed in the same manner as in the process when using the low pixels number, i.e., by converting into the sampling mode for the high pixel (standard) mode by using the sampling rate converting circuit at the side of the video DSP, with respect to the sampling rate at the side of the camera DSP corresponding to the high resolution power sensor, within the breadth of an idea of the present invention.

In accordance with the present invention, by providing the switching circuit for exchanging among the camera input signal, the external input signal and the reproduced FM signal before the A/D converter, as well as selecting the sampling clock of the A/D converter at the most appropriate clock with respect to the above-mentioned three (3) signals, the digital signal processing for both the camera and the VTR portions can be achieved by only one A/D converter, thereby bringing great effect in reducing the cost thereof.

Further, by converting the reproduced FM signal into the first sampling rate by the sampling rate converting circuit, after converting it from the analogue into the digital with the second clock which is higher in the frequency than the first clock for processing the video signal and is lower than the maximum sampling frequency of A/D converter which is used, the signal processing after the conversion can be treated in the same manner as the video signal processing during the recording operation, thereby achieving an effect of suppressing complication in the circuitry designing and of preventing from increase in the circuit scale, as well as of reducing the cost of the digital processor.

In particular, by setting the second clock mentioned above at 5 fsc, it is possible to use such the A/D converter of lower than 20 MHz in performance, which has been conventionally used in the camera DSP, thereby achieving digitalization of the VTR portion without increase in the cost of the A/D converter thereof.

Further, by suppressing around the frequency difference (fs−fwc) between the sampling frequency fs and the maximum carrier frequency fwc after converting the reproduced FM signal from the analogue into the digital signal, performance can be sufficiently maintained for the FM signal processing with the relative low sampling frequency, such as around 2 times of the FM signal band.

Further, for the video DSP, by processing with the clock from the camera DSP when operating in the camera recording mode and by processing with the clock of the video DSP when operating in the external input recording mode, an advantage can be obtained that the signal processings can be performed with ease for the two (2) signals.

Further, by conducting the data transfer between those two (2) digital processors through the sampling rate converting circuit, in addition of operating those two (2) digital processors (the camera DSP and the video DSP) on the basis of the only one oscillator, stable signal transfer can be achieved, and the oscillator can be unified as the one system, thereby obtaining an effect of reduction in the cost thereof.

Further, by conducting the conversion from sampling rate of the low pixel number mode into that of the high (standard) pixel number mode, and from the sampling rate of the high accuracy mode into that of the high pixel number mode with the sampling rate converting circuit so as to make the frequency at a constant after the conversion for any mode, the circuits after the sampling rate converting circuit can be used in common so as to be applied to camcorders of various specifications, advantageously. Namely, a merit can be obtained that unification of the circuit boards and parts can be achieved so as to accomplish reasonable or rational set designing.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications falling within the ambit of the appended claims.

We claim:

1. A recording reproducing apparatus equipped with the processing circuit, comprising:

a recording processing circuit for recording a FM modulated luminance signal into a recording medium; and a reproducing processing circuit for reproducing and processing a FM luminance signal reproduced from the recording medium, wherein the recording processing circuit includes a clip circuit for setting white clip level of an inputted luminance signal and a FM modulation circuit for frequency modulating an output of the clip circuit, wherein a maximum carrier frequency fwc corresponding to the white clip level is set to less than 7 MHz, wherein the reproducing processing circuit includes an A/D converter for converting a reproduced FM luminance signal into a digital signal, a FM demodulation circuit for frequency demodulating the digital signal to a luminance signal, a reproduced luminance signal processing circuit for reproducing and processing the luminance signal after demodulation and a sampling rate converting circuit for converting a sampling rate of the luminance signal from the FM demodulation circuit and transferring to the reproduced luminance signal processing circuit, wherein a sampling frequency fs of the A/D converter is set to greater than or equal to twice the maximum carrier frequency fwc and less than a maximum sampling frequency of the A/D converter, wherein the FM demodulation circuit is processed with the sampling frequency fs, the reproduced luminance signal processing circuit is processed with a sampling frequency fck different from the sampling frequency fs and the sampling rate converting circuit converts a sampling rate corresponding to the sampling frequency fs into a sampling rate corresponding to the sampling frequency fck.

2. A recording/reproducing apparatus as defined in claim 1, wherein the FM demodulation circuit has a low pass filter at an input stage thereof, and the low pass filter has such a characteristic that it is nearly flat up to a vicinity of a maximum carrier frequency fwc, that it has a trap point or is fully suppressed at a frequency difference (fs−fwc) between the fwc and the fs, and that it is fully suppressed in a frequency band greater than (fs−fwc).

3. A recording/reproducing apparatus equipped with an image sensor, in which a signal is converted from the image sensor, recorded on a recording medium and reproduced, comprising:

an A/D converter for converting the signal from the image sensor into a digital signal;

a first digital processor for converting the digital signal from the A/D converter into a video signal in a video signal converting process;

a second digital processor for processing the video signal from the first digital processor to a recording signal for a recording medium; and a sampling rate converting circuit for converting a first sampling rate from the first digital processor into a second sampling rate of the second digital processor and transferring a signal, wherein the A/D converter and the first digital processor have a plurality of operation modes that perform an A/D conversion and the video signal converting process at a plurality of sampling rates, wherein the second digital processor has only a single operation mode that processes a signal at one sampling rate of a plurality of sampling rates in the first digital processor, whereby the sampling rate converting circuit is operative with the first digital processor and the second digital processor process a signal at different sampling rates.

4. A recording reproducing apparatus as defined in claim 3, wherein the first and the second digital processors are constructed within an integrated circuit.

5. A recording reproducing apparatus as defined in claim 3, wherein the sampling rate converting circuit includes a memory portion of FIFO type, a rate converting filter disposed at the back stage of the memory portion and a selector for selecting an output from the memory portion and an output from the rate converting filter, and when the first digital processor and the second digital processor process a signal at a different sampling rate, the selector selects an output of the rate converting filter and transfers the output to the second digital processor, and when the first digital processor and the second digital processor process a signal at the same sampling rate, the selector selects an output of the memory portion and transfers the output to the second digital processor.

* * * * *